United States Patent [19]

Osuga

[11] Patent Number: 5,168,415
[45] Date of Patent: Dec. 1, 1992

[54] MOTOR CONTROL METHOD
[75] Inventor: Hiroshi Osuga, Tokyo, Japan
[73] Assignee: Seikosha Co., Ltd., Tokyo, Japan
[21] Appl. No.: 589,298
[22] Filed: Sep. 27, 1990
[30] Foreign Application Priority Data Sep. 29, 1989 [JP] Japan .................... 1-254450

[51] Int. Cl.⁵ ............................. H02H 5/04
[52] U.S. Cl. .......................... 361/28; 361/25; 318/783; 318/471
[58] Field of Search ............ 318/471, 472, 783; 361/23, 24, 25, 30, 26, 31, 27, 28, 33, 29, 103

[56] References Cited
U.S. PATENT DOCUMENTS

| | | | |
|---|---|---|---|
| 4,547,826 | 10/1985 | Premerlani | 361/25 |
| 4,573,132 | 2/1986 | Boothman et al. | 361/24 |
| 4,717,984 | 1/1988 | Henry et al. | 361/25 |
| 4,721,894 | 1/1988 | Graber | 361/27 |
| 5,057,962 | 10/1991 | Alley et al. | 361/24 |

Primary Examiner—A. D. Pellinen
Assistant Examiner—C. Schultz
Attorney, Agent, or Firm—Jordan and Hamburg

[57] ABSTRACT

A motor control method for determining the temperature of a motor wherein the operation and nonoperation times of the motor are monitored, an estimated temperature is determined as a function of the monitored times and predetermined temperature rise and temperature fall characteristics of the motor, and the motor is stopped and/or an alaram signal is generated if the estimated temperature exceeds a predetermined temperature.

7 Claims, 2 Drawing Sheets

MOTOR CONTROL METHOD

FIELD OF THE INVENTION

The present invention relates to a motor control method for preventing a motor from being abnormally overheated.

BACKGROUND OF THE INVENTION

In order to prevent the abnormal overheating of a motor due to extended use, it has hitherto been the practice to control the operation of the motor by measuring the temperature around the heating portion thereof with a thermistor, or by attaching a cooling fan to the motor to cool the heating portion of the latter. Alternatively, a high-quality motor having a self-cooling function has been employed to thereby prevent the motor from being overheated.

The above-mentioned conventional methods have the disadvantage that they are costly and are consequently one of the causes of increases in the cost of the equipment using the motor.

SUMMARY OF THE INVENTION

An object of the present invention is to provide a novel motor control method which is capable of controlling the temperature of a motor without using a temperature detecting element such as a thermistor.

In order to achieve the above object, the motor control method according to the present invention includes monitoring the motor operating and nonoperating times to estimate the current temperature of the motor on the basis of predetermined temperature rising characteristic thereof in operation and the temperature falling characteristic thereof in non-operation. When the estimated value for the motor temperature exceeds a predetermined value, the operation of the motor is stopped.

Further, instead of, or in addition to, stopping the operation of the motor, an alarm may be generated.

BRIEF DESCRIPTOIN OF THE DRAWINGS

In order to enable a clearer understanding of the invention, it will now be described with further reference to the accompanhing drawings, wherein.

DESCRIPTION OF THE PREFERRED EMBODIMENTS

Figure 2:
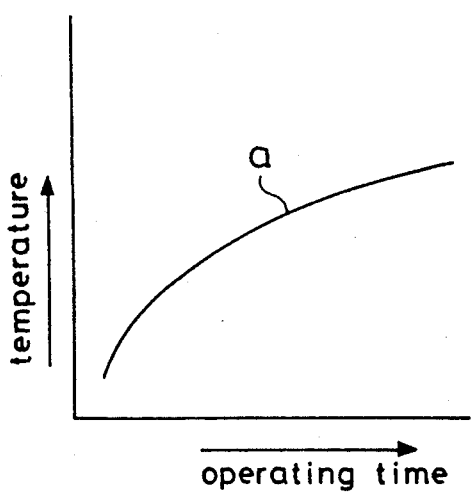
FIG. 2 is a graph showing a motor temperature rising curve plotted against motor operating time.
Figure 3:
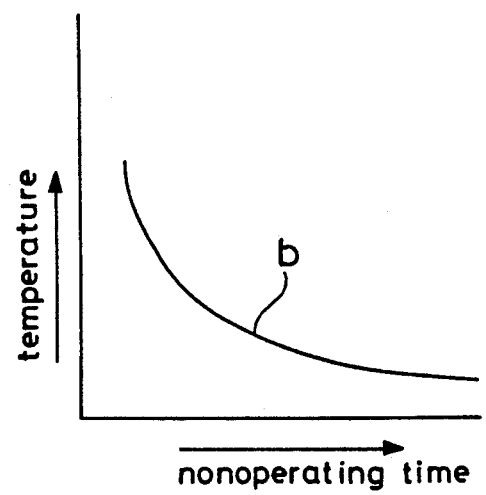
FIG. 3 is a graph showing a motor temperature falling curve plotted against motor nonoperating time.

The present invention is based on the fact that there is a certain relationship between the motor operating time and the motor temperature elevation and a certain relationship between the motor nonoperating time and the motor temperature drop. That is, according to the invention, a temperature rising characteristic curve "a" as shown in FIG. 2 and a temperature falling characteristic curve "b" as shown in FIG. 3 are obtained in advance. The current temperature of the motor is estimated on the basis of data on the curves "a" and "b" by monitoring the motor operating and nonoperating times. The motor is operated or stopped after comparing the estimated temperature value with a predetermined value indicative of a critical temperature for the motor, in order to prevent the motor from being abnormally overheated.

Figure 1:
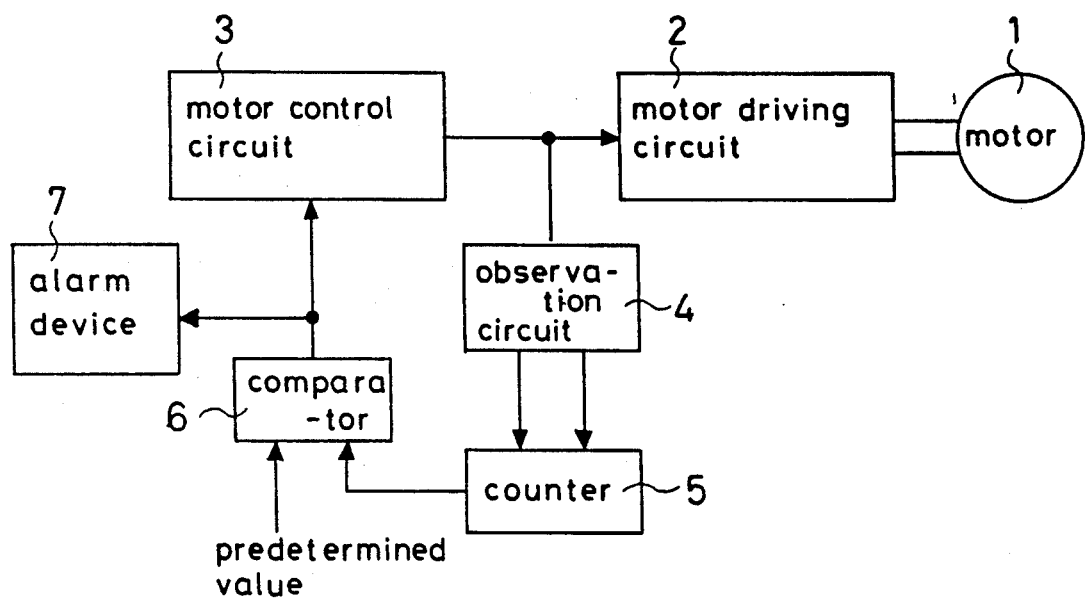
FIG. 1 is a block diagram of a circuit that may be used to perform a motor control method in accordance with one embodiment of the present invention.

One example of a circuit for performing the above control method is shown in FIG. 1. This circuit includes a motor driving circuit 2, a motor control circuit 3, an observation circuit 4, a counter 5, a comparator 6 and an alarm device 7 such as a buzzer.

The control circuit 3 generates a drive signal (DR signal) for controlling the operation and stopping of the motor 1 such that when the DR signal has a high level "H", the motor 1 operates and when it has a low level "L", the motor 1 stops.

The observation circuit 4 senses whether the DR signal is "H" or "L". When the DR signal is "H", the counter 5 counts in an up-counting mode at a rate correlated to the temperature rising characteristic of the curve "a" shown in FIG. 2. When the DR signal is "L", the counter 5 counts in a down-counting mode at a rate correlated to the temperature falling characteristic curve "b" shown in FIG. 3 due to natural cooling. Accordingly, it is possible to estimate the current temperature of the motor 1 from the count stored in the counter 5.

The comparator 6 has preset therein a predetermined value corresponding to the critical temperature for the motor 1 so that the count value stored in the counter 5 may always be compared to this predetermined value. As a result, the motor control circuit 3 and the alarm device 7 are controlled by the output of the comparator 6.

Figure 4:
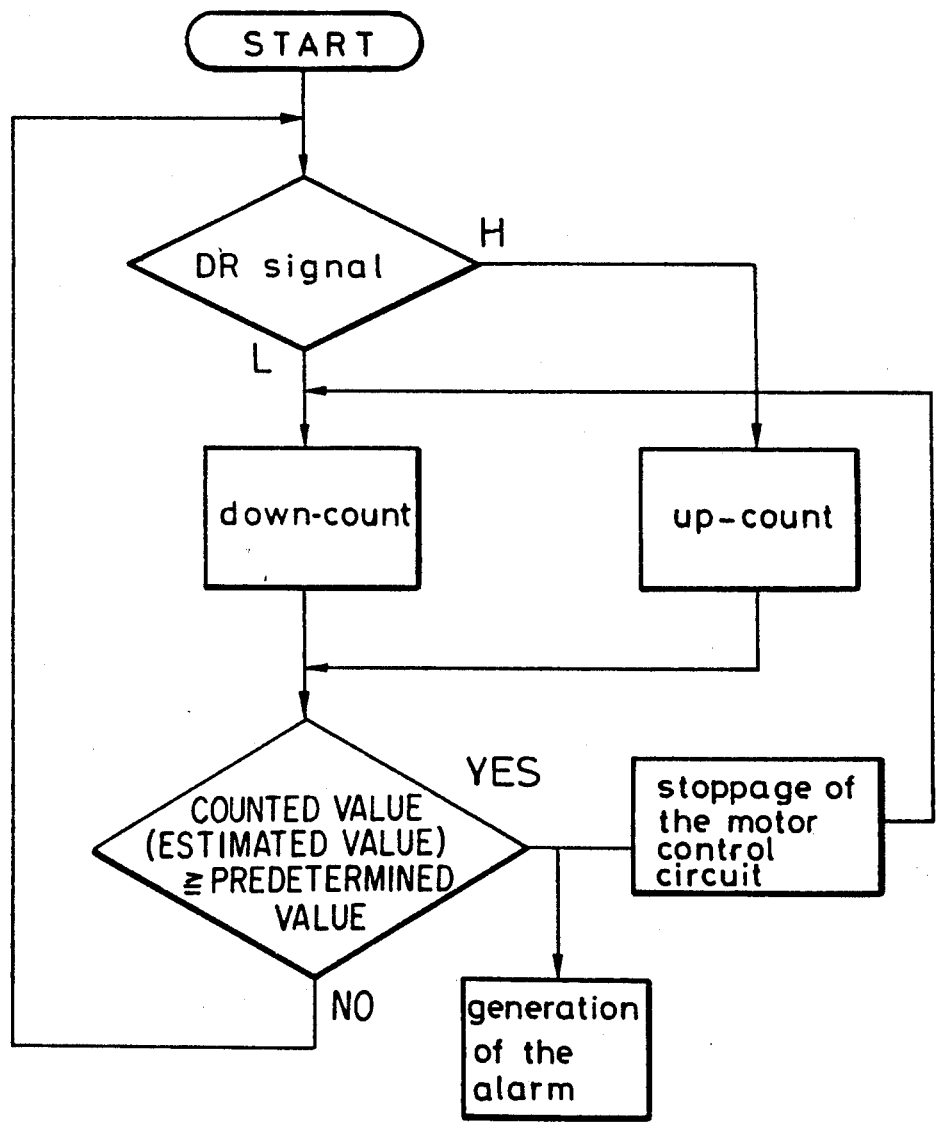
FIG. 4 is a flow chart showing a motor control operation according to the present invention.

Next, the control operation according to the method of the present invention will be described with reference to the flow chart of FIG. 4.

The DR signal from the motor control circuit 3 is monitored by the observation circuit 4 which detects whether the signal is "H" or "L". When the DR signal is "H", that is when the motor 1 is in operation, the counting of the counter 5 is incremented in sequence at a rate correlated to the temperature rising characteristic of the curve "a" shown in FIG. 2. When the DR signal is "L", that is when the motor 1 is not in operation, the counting of the counter 5 is decremented in sequence at a rate correlated to the temperature falling characteristic of the curve "b" shown in FIG. 3. The counted value in the counter 5 is compared to the predetermined value in sequence by the comparator 6, and when it exceeds the predetermined value, that is, when the current temperature (estimated temperature) of the motor 1 reaches a critical temperature, the output of the comparator 6 goes "H" resulting in the controlling of the operation of the motor control circuit 3 to inhibit the operation of the motor 1. At the same time, an alarm sound may be generated by the alarm device 7.

When the motor 1 is not in operation, it is naturally cooled and as described previously, the counter 5 counts in a downcounting mode at a rate correlated to the temperature falling characteristic of the curve "b" shown in FIG. 3 until the count value in the counter 5 becomes smaller than the predetermined value so that the output of the comparator 6 is changed to "O". The inhibition of the motor operation is then released and the operation of the alarm device 7 is stopped.

It should be noted that although, in the instant embodiment, the stopping of the motor 1 and the operation of the alarm device 7 are performed simultaneously when the count value in the counter 5 corresponding to the current temperature (estimated value) of the motor 1 exceeds the predetermined value, it is, of course, possible to perform only one of the two operations of the above discussed stopping the motor and the operation of the alarm device 7.

The buzzer representing the alarm device 7 may be replaced with a light-emitting means such as an LED which can be lit or flashed.

As described above, it is possible with the present invention to prevent the overheating of an ordinary motor without replacing the motor with an expensive high-quality motor and without using a thermistor or a cooling fan, thereby reducing the cost of equipment using the motor.

What is claimed is:

1. A motor control method comprising estimating the current temperature of a motor with reference to a predetermined temperature rising characteristic of the motor, as a function of time and independent of motor current, in operation and a temperature falling characteristic of the motor, as a function of time, in nonoperation by monitoring the operating and nonoperating time of the motor, and stopping the operation of the motor when an estimated value for said current temperature of the motor exceeds a predetermined value.

2. A motor control method according to claim 1, comprising generating an alarm signal and stopping said motor when said estimated value exceeds said predetermined value.

3. A motor control method comprising estimating the current temperature of a motor with reference to a predetermined temperature rising characteristic of the motor, as a function of time and independent of motor current, in operation and a temperature falling characteristic of the motor, as a function of time, in nonoperation by monitoring the operating and nonoperating times of the motor, and generating an alarm signal when an estimated value for the current temperature of the motor exceeds a predetermined value.

4. A method for controlling a motor comprising determining the temperature rise vs time characteristic of the motor when it is in operation, independently of motor current, determining the temperature fall vs time characteristic of the motor when it is stopped, monitoring the operation and non-operation times of the motor, estimating the temperature of the motor as a function of said monitored operation and nonoperation times and said determined rise time and fall time characteristics, respectively, and stopping said motor and/or generating an alarm signal when said estimated temperature exceeds a predetermined value.

5. The method for controlling a motor in accordance with claim 4, wherein said step of estimating comprises incrementing a counter when said motor is in operation, and decrementing said counter when said motor is not in operation, whereby the count of said counter corresponds to said estimated temperature.

6. The method for controlling a motor in accordance with claim 5, wherein said step of incrementing comprises incrementing said counter at a rate that is a function of said temperature rise characteristic.

7. The method for controlling a motor in accordance with claim 5, wherein said step of decrementing comprises decrementing said counter at a rate that is a function of said temperature fall characteristic.

* * * * *